(No Model.) 2 Sheets—Sheet 1.
C. B. OVERBAUGH.
MACHINE FOR MAKING CONFECTIONS, &c.
No. 417,579. Patented Dec. 17, 1889.
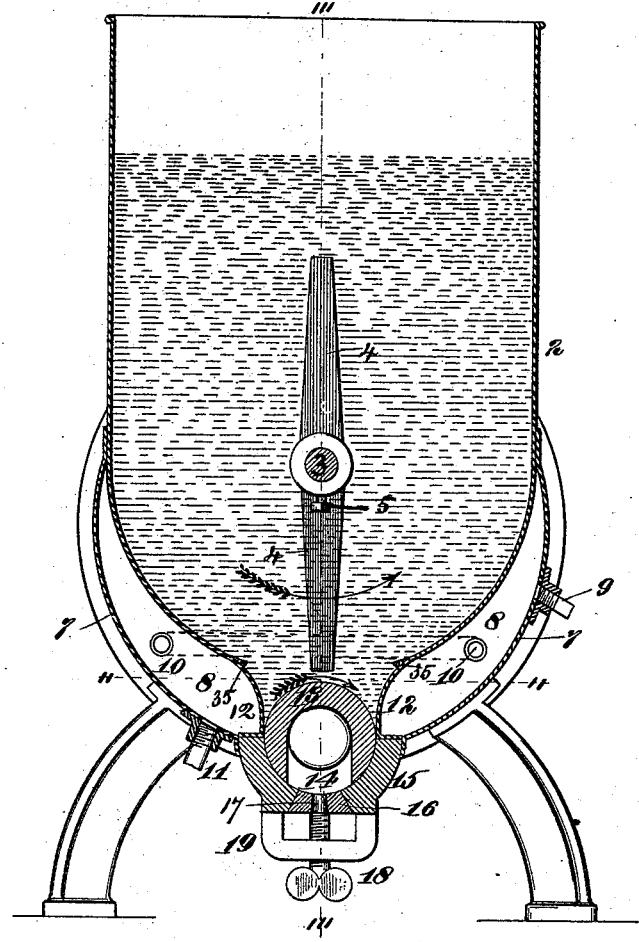
Fig. I.
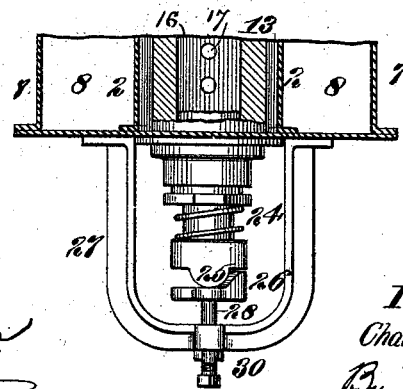
Fig. II.
Attest:
Emma Arthur
George E. Cruse
Inventor:
Charles Bates Overbaugh
By Knight Bro'
Attys (No Model.) 2 Sheets—Sheet 2.
C. B. OVERBAUGH.
MACHINE FOR MAKING CONFECTIONS, &c.
No. 417,579. Patented Dec. 17, 1889.
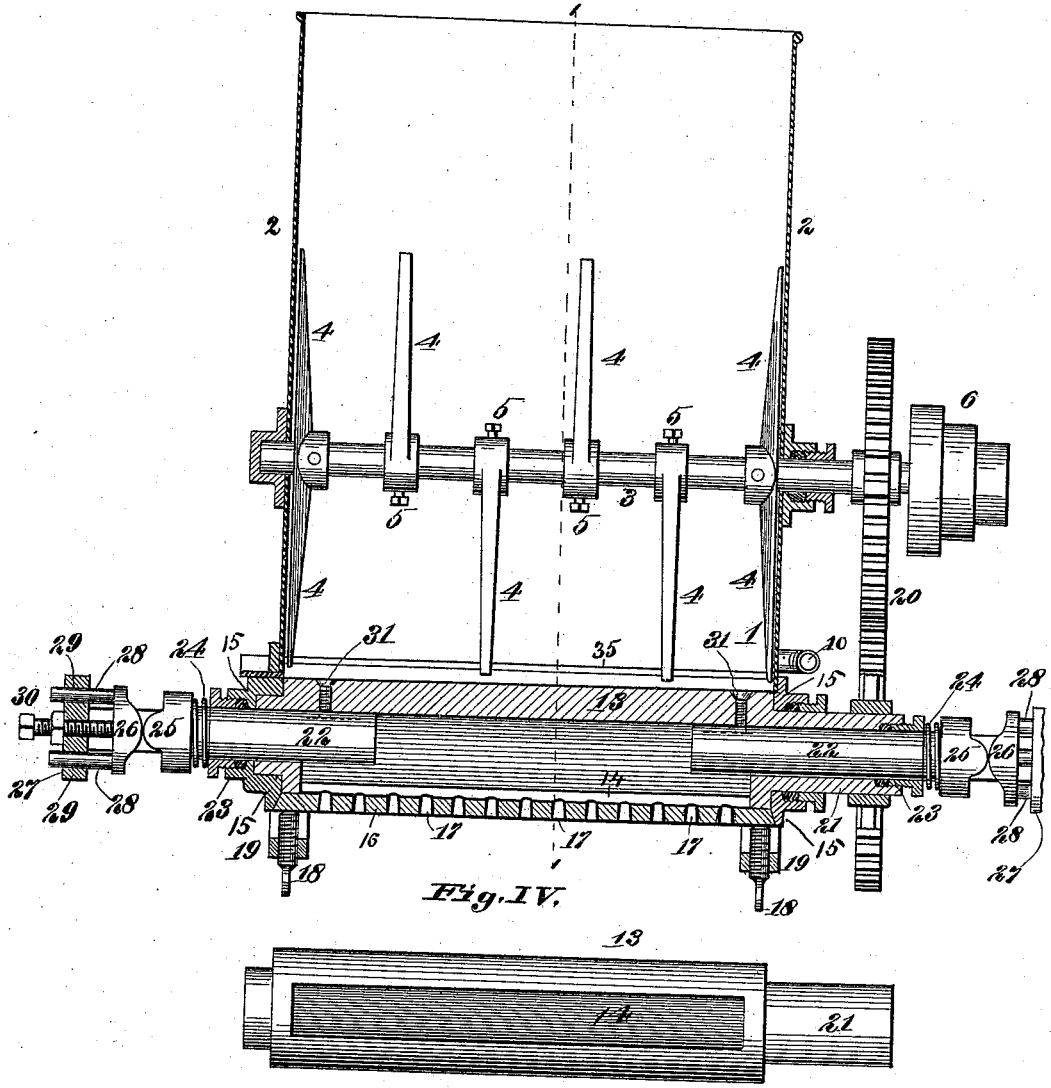
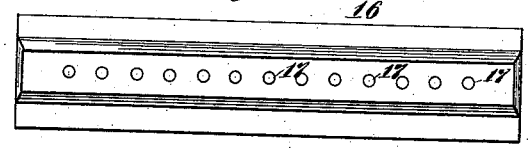
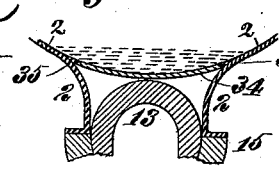
Attest: Emma Arthur, George E. Cruse
Inventor: Charles Bates Overbaugh
By Knight Bros
Attys

UNITED STATES PATENT OFFICE.

CHARLES BATES OVERBAUGH, OF ST. LOUIS, MISSOURI.

MACHINE FOR MAKING CONFECTIONS, &c.

SPECIFICATION forming part of Letters Patent No. 417,579, dated December 17, 1889.

Application filed January 28, 1889. Serial No. 297,804. (No model.)

*To all whom it may concern:*

Be it known that I, CHARLES BATES OVER-BAUGH, of the city of St. Louis, in the State of Missouri, have invented a certain new and useful Improvement in Machines for Manufacturing Confections, Jellies, &c., of which the following is a full, clear, and exact description, reference being had to the accompanying drawings, forming part of this specification, and in which—

Figure I is a vertical section of my improved machine taken on line I I, Fig. III. Fig. II is a detail transverse section taken on line II II, Fig. I. Fig. III is a vertical section taken through the machine in the opposite direction to that in which Fig. I is taken. This section is taken on line III III, Fig. I. Fig. IV is a view of the discharge-cylinder valve removed. Fig. V is a top view of the discharge-plate removed. Fig. VI is a detail view showing the slide for closing the bottom of the kettle or tank.

My invention relates to an improved machine intended for use in the manufacture of confections, jellies, and the like; and my invention consists in features of novelty hereinafter fully described, and pointed out in the claims.

Referring to the drawings, 2 represents a kettle or tank, into which the matter to be treated is placed. This matter is of a liquid or pasty character, and may be material for the manufacture of confections, jellies, soft cake, dough, or other commodities. Within the kettle or tank 2 is a shaft 3. On the shaft are a number of arms or stirrers 4, secured to the shaft by means of set-screws 5 or by other suitable means. On one end of the shaft are driving-pulleys 6, by which the arms are rotated for the purpose of stirring the contents in the kettle. At the lower end of the tank or kettle is a jacket 7, forming, with the tank, steam-chambers 8. The steam is circulated through these chambers 8 for the purpose of heating the contents of the kettle or tank, and it may enter one of the chambers through a pipe 9, then pass through a pipe 10 into the other chamber, and exhaust through a pipe 11. It will thus be seen that the heating and stirring of the contents of the kettle will be continuous. The lower end of the kettle or tank terminates in a narrow neck 12, which is occupied by a valve consisting of a revolving cylinder 13. The cylinder is journaled at its ends in the walls of the kettle or tank, and has an opening 14 at one side extending preferably throughout its entire length. The lower half of this cylinder fits in a housing 15, the upper half extending into the neck of the kettle or tank. The bottom of the housing 15 is composed of a plate 16, having a number of perforations 17. This plate is held in place by means of set-screws 18, which pass through yokes or U-shaped frames 19, secured to the bottom of the housing 15 at each end. By means of the set-screws the plates will be firmly held in place and easily removed, when necessary.

To remove the contents of the kettle or tank, the cylinder 13 is turned in the direction indicated by the arrow in Fig. I. As soon as the opening 14 of the cylinder is turned into communication with the kettle or tank the material passes in and fills the cylinder. Then, on the further movement of the cylinder, the opening 14 is moved out of communication with the kettle or tank, and the material contained in it passes out through the opening 17 in the plate 16. In this manner the contents of the kettle or tank can be removed as desired. The cylinder may be turned by having cog-wheel connection 20 with the shaft 3, one of the cog-wheels being secured to the shaft 3 and the other to a neck 21 on one end of the cylinder.

For the purpose of producing a forced discharge of the material from the cylinder, I employ plungers 22, which pass through stuffing-boxes 23 on the ends of the cylinder, and extend into the cylinder. These plungers are held in their outer position, as shown in Fig. II, normally by means of springs 24, but are forced inward when the cylinder revolves to bring the opening 14 into communication with the opening 17 to produce the forced feed. They may be thus forced inward by means of cams 25 thereon, which come in contact with non-rotating cams 26, supported in yokes 27, secured to the ends of the jacket 7. The cams 26 are held from rotary movement by means of pins 28, fitting in openings 29 in the yokes 27, and these cams may be adjusted in or out to regulate the extent of the inward movement of the plungers by means of set-screws 30 passing through the yokes 27. The plungers are made to turn with the cylinder by means of set-screws 31, passing through the cylinder and fitting at their inner ends in longitudinal grooves formed in the plungers. These grooves are represented by dotted lines in Fig. III. It will thus be seen that each time the cylinder is turned to bring the opening 14 in communication with the openings 17 the plungers will be forced forward to effect a positive feed of the contents in the cylinder.

When it is desired to change the coloring of the material in the kettle or tank, as is frequently the case, a plate 34 (see Fig. VI) is employed to shut off the cylinder 13 from the kettle or tank. This plate has dovetail-connection 35 with the neck of the kettle or tank, and by shoving it in it closes off the cylinder from communication with the kettle or tank, and then by turning the cylinder the small amount of material beneath the plate 34 can be discharged. Then the coloring-matter is added and the plate withdrawn again, and the differently-colored materials will not be mixed.

The holes 17 are preferably made larger at their lower than at their upper ends, so that there will be no liability for the material to clog in them.

I claim as my invention—

1. The combination of the kettle or tank, a cylinder forming the bottom of the tank or kettle and having an opening in one side, the housing having a perforated bottom, and plungers for forcing the material from the cylinder through the perforated bottom, substantially as set forth.

2. The combination of the kettle or tank, a cylinder located in the bottom of the kettle or tank and having a discharge-opening, plungers located in the ends of the cylinder, and cams for automatically moving the plungers, substantially as and for the purpose set forth.

3. The combination of the kettle or tank, a cylinder located in the bottom of the kettle or tank and having a discharge-opening, plungers 22, located in the ends of the cylinder, cams 25 on the plungers, cams 26, means for adjusting the cams 26, and springs 24, substantially as and for the purpose set forth.

4. The combination of the kettle or tank, a cylinder located in the bottom of the kettle or tank and having a discharge-opening, spring-actuated plungers 22, having cams 25, stationary cams 26, set-screws 30, and guide-pins 28, all substantially as and for the purpose set forth.

5. The combination of the kettle or tank, the cylinder forming the bottom of the tank or kettle and having an opening in one side, the housing having a perforated bottom, the shut-off plate, and plungers for forcing the material from the cylinder through the perforated bottom, substantially as set forth.

CHAS. BATES OVERBAUGH.

In presence of—
BENJN. A. KNIGHT,
EDW. S. KNIGHT.